United States Patent
Camarasa

(10) Patent No.: US 8,240,614 B2
(45) Date of Patent: Aug. 14, 2012

(54) ELASTOMER-BASED MODULAR MULTI-AXIS VIBRATION/SHOCK ISOLATION DEVICE

(75) Inventor: Patrick Camarasa, Rebigue (FR)

(73) Assignee: Astrium SAS, Paris (FR)

( * ) Notice: Subject to any disclaimer, the term of this patent is extended or adjusted under 35 U.S.C. 154(b) by 1030 days.

(21) Appl. No.: 12/158,083

(22) PCT Filed: Dec. 21, 2006

(86) PCT No.: PCT/FR2006/002839
§ 371 (c)(1),
(2), (4) Date: Jun. 19, 2008

(87) PCT Pub. No.: WO2007/077350
PCT Pub. Date: Jul. 12, 2007

(65) Prior Publication Data
US 2009/0008504 A1    Jan. 8, 2009

(30) Foreign Application Priority Data
Dec. 21, 2005  (FR) ...................................... 05 13083

(51) Int. Cl.
*B64G 1/22*     (2006.01)
*F16F 15/08*    (2006.01)
(52) U.S. Cl. ..................................... 244/173.2; 267/136
(58) Field of Classification Search ................ 244/173.2, 244/173.1, 158.1; 267/136
See application file for complete search history.

(56) References Cited

U.S. PATENT DOCUMENTS

| 4,032,202 A | 6/1977 | Ishikawa et al. |
| 5,305,981 A | 4/1994 | Cunningham et al. |
| 5,971,375 A | 10/1999 | Simonian et al. |
| 7,637,359 B2 * | 12/2009 | Melz et al. ................. 188/266.7 |

FOREIGN PATENT DOCUMENTS

DE  1913901  4/1965
(Continued)

OTHER PUBLICATIONS

JP 2000-145889 A to Kikuchi et al. (2000) Machine translation from JPO website http://www.ipdl.inpit.go.jp/homepg_e.ipdl.*

(Continued)

*Primary Examiner* — Tien Dinh
*Assistant Examiner* — Richard R Green
(74) *Attorney, Agent, or Firm* — Patzik, Frank & Samotny Ltd.

(57) ABSTRACT

The device comprises at least three isolating modules each having two rigid pieces, one of which is fastened to the carrier structure and the other of which is fastened to the support for the vibrating equipment, these pieces being linked by at least one isolating stud made of an elastomer, which attenuates the transmission of low-amplitude vibrations from the equipment to the structure, the deformation of at least one stud in tension-compression and in shear being limited by three flexible stops each mounted on only one of the pieces and the free end of which is facing the other of said pieces and not in contact with it, at rest. Each stop comprises an elastomer element coming into contact with the facing other piece during deformations of sufficient amplitude of the isolating stud, the stiffness of the elastomer of the stop being greater than that of the stud. Application to the isolation of vibrating equipment on a satellite carrier structure.

36 Claims, 9 Drawing Sheets

FOREIGN PATENT DOCUMENTS

| | | |
|---|---|---|
| DE | 10054323 A1 | 5/2002 |
| EP | 1564054 B1 | 3/2008 |
| JP | 59-009328 | 1/1984 |
| JP | 60-191733 U | 12/1985 |
| JP | 3-96499 A | 4/1991 |
| JP | 08-014328 A | 1/1996 |
| JP | 2000145889 A | 5/2000 |
| JP | 2000-213596 A | 8/2000 |
| JP | 2000-289699 A | 10/2000 |
| JP | 2001140984 A | 5/2001 |
| JP | 2003-139195 A | 5/2003 |
| JP | 2005-226745 A | 2/2004 |
| JP | 2005-106138 A | 4/2005 |

OTHER PUBLICATIONS

PCT International Search Report and Written Opinion, PCT/FR2006/002839, dated Jun. 13, 2007.

Vibration-Proof Suspension Device, English translation of Abstract of JP 59-009328, published Jan. 18, 1984.

Elastic Bearing with Progressively Operating Stop with Stroke Limitation, English translation of Abstract of DE 1913901, published Apr. 15, 1965.

Sample Protection Method and Device Therefor, English translation of Abstract of JP 03-096499, published Apr. 22, 1991.

Japanese Patent Office, Office Action issued in corresponding JP2008-546524, mailed Apr. 26, 2012.

* cited by examiner

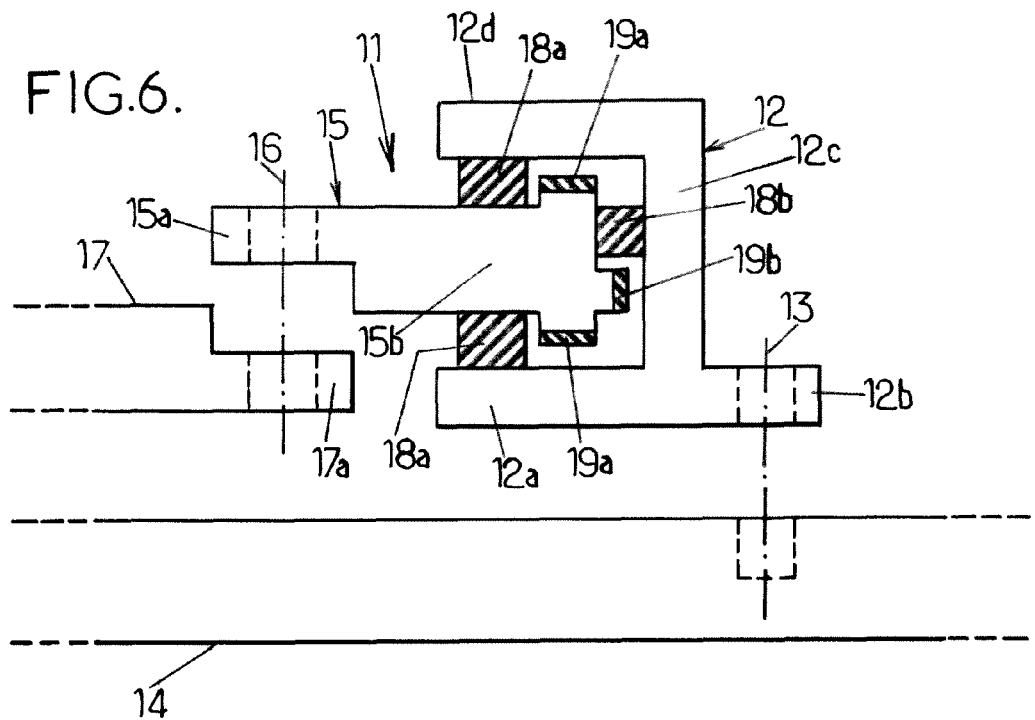

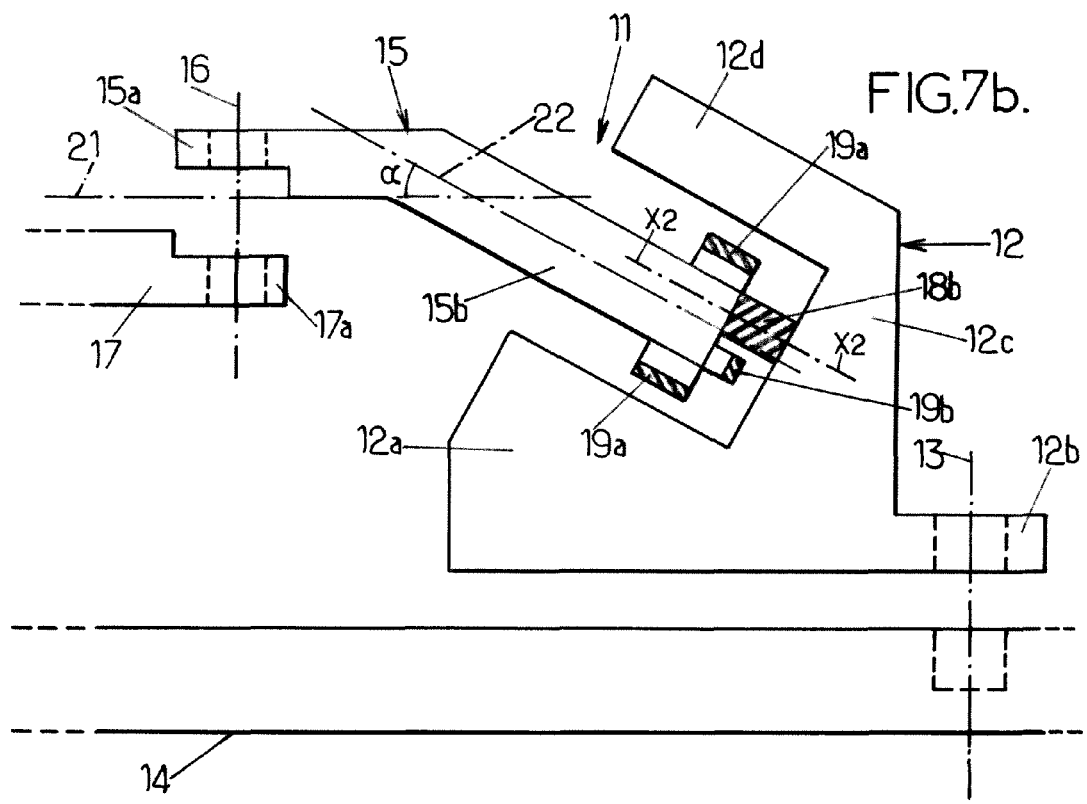
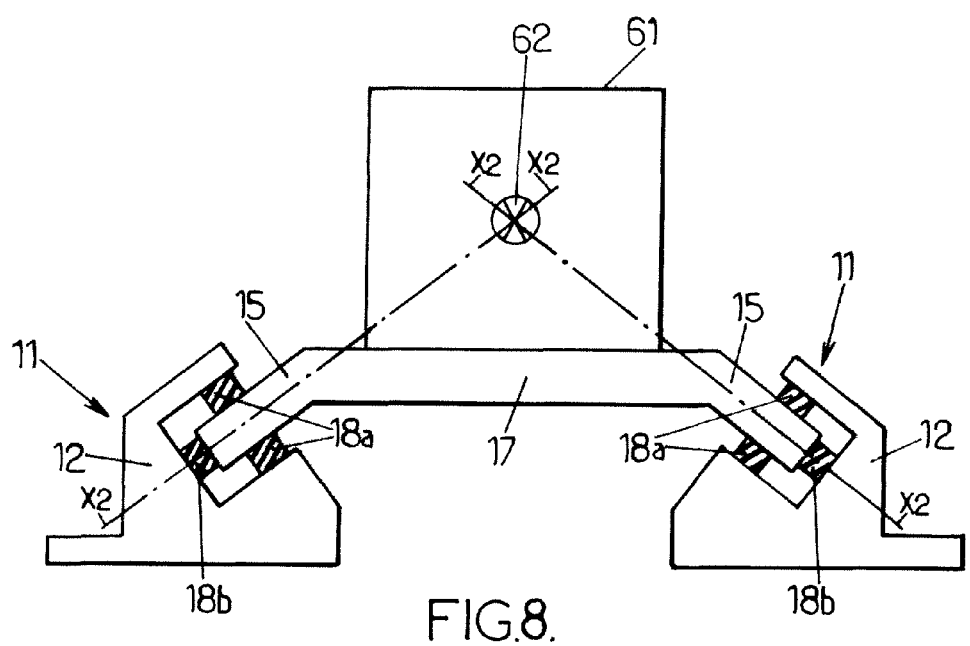

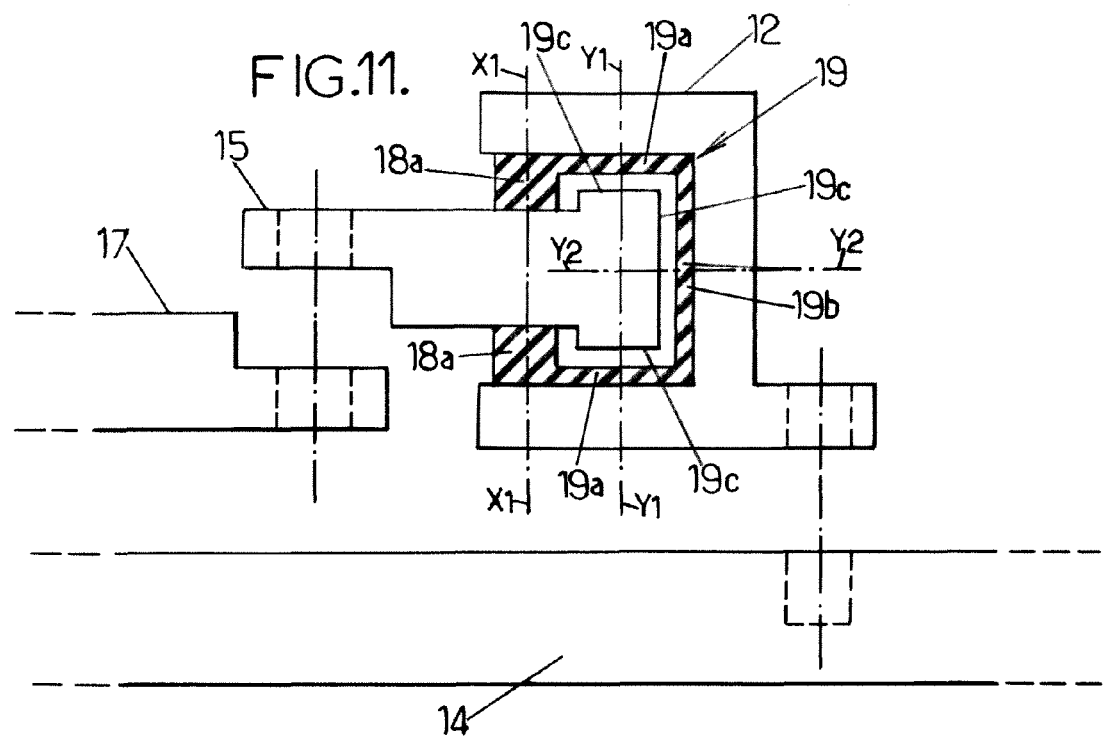
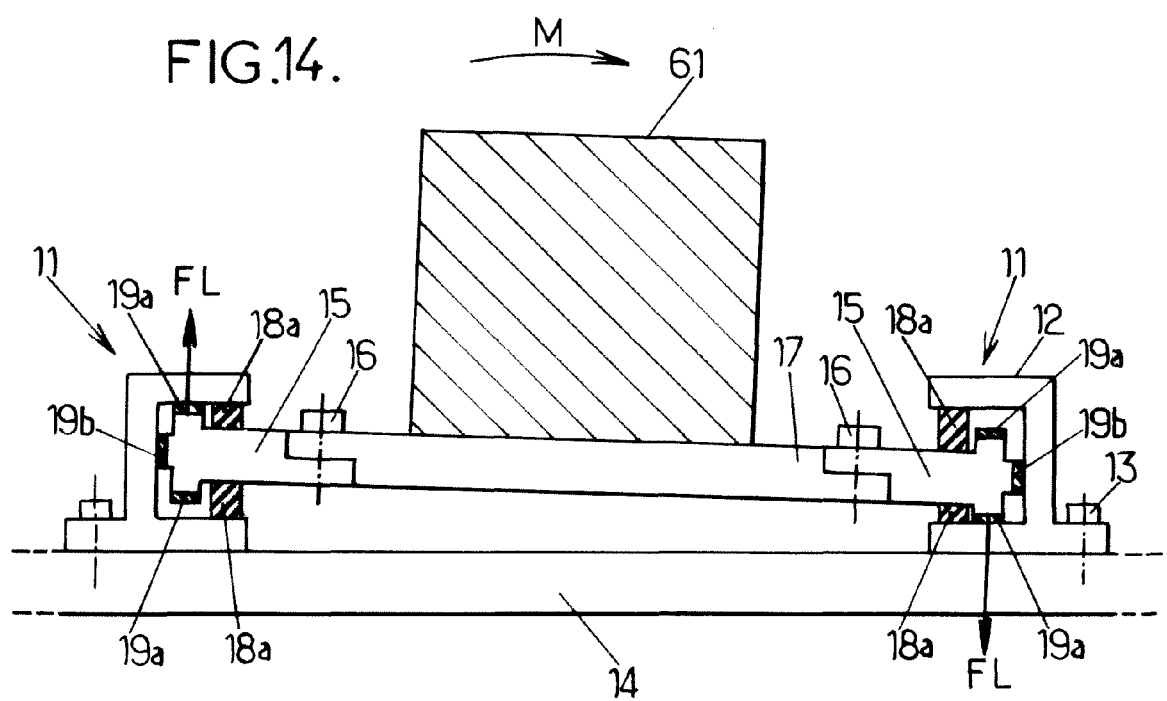

ELASTOMER-BASED MODULAR MULTI-AXIS VIBRATION/SHOCK ISOLATION DEVICE

FIELD OF THE INVENTION

The present invention relates to a multi-axis device for isolation of the vibrations generated by vibrating equipment and transmitted to a supporting structure for this equipment, such as, for example, in the case where the vibrating equipment comprises at least one element that is rotating and/or displaced in periodic translation, where the term isolation should be understood in the sense of at least one attenuation by elements placed in series between the source of vibrations, which is the vibrating equipment, and the support to be isolated, which is the supporting structure.

BACKGROUND OF THE INVENTION

The isolation device must also, in certain cases, fulfill another function, at first sight in conflict with that presented hereinabove, which is to attenuate dynamic loads, such as vibrations and shocks, large and transient, applied to the supporting structure and propagating through the isolation device as far as the equipment, which could be sensitive to these loads.

In order to facilitate the understanding of the invention, the latter is described hereinafter more particularly in the framework of certain applications associated with the space industry, and for which the invention presents a particular interest for the applicant.

It is well known that some actuators, commonly used for the attitude control on satellites, contain one or more rotating elements, whose balancing, which is always imperfect in practice, generates vibrations propagating through the structure of the satellite. This is the case, for example, for reaction wheels, momentum wheels, control moment gyroscopes (or CMG), flywheels, etc.

Other equipment installed on board satellites may also generate such vibrations, such as, for example, refrigerators using compressors.

The vibrations created by this equipment may be transmitted as far as payloads of the satellites and degrade their performance, as is the case, for example, for optical observation instruments that are particularly sensitive to the movements of the sightline that are detrimental to the quality of the images obtained.

In order to counter these damaging effects, according to the prior art, the interfering equipment or an interfering assembly of equipment is mounted on an isolation device forming a mounting interface for the equipment or assembly of equipment on the supporting structure. In addition to this mounting function, the isolation device must attenuate the transmission of the vibrations generated by at least one piece of equipment according to a certain frequency bandwidth depending on the application. In the case where at least one piece of equipment is an actuator in torque or in force, the isolation device must also transmit the useful torques or forces generated by this equipment according to a transmissibility frequency bandwidth also specified by the user. On the other hand, it is also desirable, if not necessary, that the isolation device attenuate the very high dynamic loads applied to the supporting structure during the launch phase of the satellite, which seems to be contradictory with the function for isolation of the vibrations of at least one piece of equipment, since these vibrations are several orders of magnitude smaller than the dynamic loads at launch.

The isolation device according to the invention must therefore operate:
- on the ground, in particular during the performance tests and the qualification tests carried out prior to the launch of the satellite,
- during the launch of the satellite, in particularly challenging environments with vibrations, acoustic noise and shocks, and
- when the satellite is in orbit, where the performance for isolation from very small vibrations will need to attain the expected levels.

Lastly, the isolation device according to the invention must also sometimes maintain over time a certain alignment stability of the vibrating equipment with respect to the supporting structure.

The following numerical values correspond to a typical operating range of one particular embodiment of the device of the invention when it is applied to the isolation of actuators of the reaction wheel or CMG type on board satellites:
- mass of a vibrating piece of equipment to be isolated: typically from 1 kg to 30 kg;
- interfering forces and torques generated by the vibrating equipment: 1 N to 100 N over a frequency range from 10 Hz to 1000 Hz;
- desired attenuation factor for vibrations and shocks: 3 to 50 in the range 10 Hz to 1000 Hz (typically an attenuation with a slope of −2 in log scale over the frequency range);
- overload factor of the isolation device: less than 2;
- desired transmissibility factor: 1±5% in the range 0 to 10 Hz;
- alignment stability over time: able to go typically up to 0.05°;
- environment at launch: typically 20-100 g in the range 10-100 Hz (vibrations) and 1000 g in the range 100-1000 Hz (shocks) (g being the acceleration of the earth's gravitational field).

At this point in the description, it should be noted that the device provided by the invention which is presented hereinbelow may equally be used to isolate, for example an assembly of equipment, rather than a single piece of equipment, some of which cause interference since they are vibrating, and all mounted onto the same equipment-holder platen. The isolation device according to the invention may also be used at the interface between one part of a satellite, for example a service module, and another part of the satellite, for example a payload. In these two cases, the numerical values hereinabove, given by way of example, are not necessarily applicable.

From the U.S. Pat. No. 5,305,981 and U.S. Pat. No. 5,971,375, multi-axis isolation devices are known that comprise a plurality of isolation studs disposed between two structural parts, one of which carries vibrating equipment, and the other is to be fixed to the supporting structure of the satellite. For example, U.S. Pat. No. 5,305,981 describes a device composed of 6 isolation elements in a symmetrical arrangement in a symmetrical hexapod configuration of 3 pairs of oblique studs providing a viscous damping and an attenuation of the vibrations and shocks when the satellite is launched and in operation in space. In this device, the isolation elements are mounted onto links with two degrees of freedom allowing axial play and the flexing moments to be minimized. Buffers situated between the two structural components of the device limit the excursions of the isolation elements, in particular when the satellite is launched. It should be noted that with this concept, 6 isolation elements are required in order to achieve total isolation from forces and torques along the three axes. The mounting of the device onto the structure of the satellite requires an intermediate structural part. The buffers are not integrated into the isolation elements. The design is not modular. A generalization of the design to other types of isolation is not straightforward, in particular, when the number of degrees of freedom to be isolated varies. The adjustment of the device as a function of the specifications for isolation from the small vibrations generated by the equipment and for isolation from the high levels of vibrations and shocks during launch, together with the transmissibility of the useful torques generated by the equipment, is not straightforward. The size of the device, its mass, its lack of modularity are not favorable to its design, its construction or its application.

The device described in U.S. Pat. No. 5,971,375 has a similar configuration. The same limitations are apparent, with in addition a complex layout of a plurality of springs.

From the patent document JP 2000 145889, inserts for mounting a piece of equipment onto a supporting structure are also known that comprise (see FIGS. 12 and 13) two rigid components, one external 112, the other internal 115, rigidly attached to the equipment and connected to one another by means of a plurality of isolation studs 118 made from elastomer, and such that the internal component 115 comes to a stop against the external component 112 whenever the load applied to one of the studs 118 exceeds a permitted limit. In the case considered here of an equipment isolation system on board satellites having to withstand the launch, the application of the principle described in JP 2000 145889 necessarily leads to the installation of a large number of buffers 119 between said internal components 115 and external components 112, in order to block all of the degrees of freedom in translation and tilting of the internal component 115 with respect to the external component 112, owing to extremely high loads to which the device is subjected along these degrees of freedom during launch. One embodiment of such a device is presented in FIG. 12 corresponding to the device of the document JP 2000 145889. This type of insert, whose necessary complexity of design and construction is highlighted, could possibly be used as such for isolating the small vibrations generated by a piece of equipment. However, its design is such that, when the equipment and its supporting structure are subjected with respect to one another to large movements and accelerations with vibrations and shocks, for example during the launch phase of the satellite, several, rather than only one, buffers 119 of the insert will come into action simultaneously, for example as is shown in FIG. 13 during tilting, due to moments M. Since all the moments can generate excessive stresses on the studs 118, they must be blocked by buffers 119. This will create enormous local forces FL within the insert, and will inevitably lead to its destruction, since, as previously mentioned, the high-frequency vibrations sustained during the launch are of a very high level. In order to avoid this, it will be necessary to block all the relative movements of the internal component 115 and external component 112 by a rigid connection, by means of an appended stacking device. It will subsequently be necessary to unlock this stacking device once in orbit, by means of pyrotechnical or thermal elements, which will render the overall isolation system substantially more complex.

The problem on which the invention is based is to provide a multi-axis isolation device for at least one piece of equipment that generates vibrations, installed on board a supporting structure such as a satellite, and of the type presented hereinabove, and which overcomes the aforementioned drawbacks of the prior art and is more suited to the various demands encountered in practice than the known devices, in particular according to the aforementioned US and JP patent documents.

SUMMARY OF THE INVENTION

The goal of the present invention is therefore to provide simple solutions to the known limitations of the prior art and, for this purpose, the invention provides a multi-axis isolation device for at least one piece of equipment that generates vibrations, installed on board a supporting structure, and which comprises at least three isolation modules distributed around the periphery of said vibrating equipment or of a support of the latter, and which is characterized in that each isolation module comprises two rigid components one of which, called external component, is designed to be fixed to the supporting structure, and the other of which, called internal component, is designed to be fixed to said vibrating equipment or to its support, said internal and external components being connected to one another by at least one isolation stud made from elastomer, attenuating by its deformation along at least one of its axes in traction, compression or shear, the transmission of vibrations of low amplitude generated by said equipment, each isolation module also comprising a lateral flexible buffer and two flexible longitudinal buffers, acting in opposing directions, each flexible buffer being mounted onto one of the internal and external components only, and having one free end facing the other of said internal and external components and having no contact with said other component at rest.

The term "longitudinal" here denotes the normal to the installation plane of the equipment or any direction inclined to the installation plane but with a main component normal to the latter, and the term "lateral" denotes any direction perpendicular to the "longitudinal" direction.

Advantageously, the flexible buffers of the isolation modules each comprise at least one element made from elastomer coming into contact with said other facing rigid component, in the active position of the flexible buffer, during deformations of sufficient amplitude of the isolation stud or studs in such a manner that the elastomer element of the flexible buffer works in compression when the buffer is active.

Thus, in one particular embodiment of flexible buffer according to the invention, at least one flexible buffer of at least one module can be formed from an elastomer element fixed onto said external component in such a manner that this element is facing said internal component, having no contact with it at rest. Advantageously, in a manner known per se, the part of said internal component facing said elastomer element is formed from a metal protrusion from said internal component, in order to reduce the play between said flexible buffer and said facing rigid component.

In another particular embodiment of flexible buffer according to the invention, at least one flexible buffer of at least one module can comprise a rigid part which is formed from a metal protrusion from the component of the module carrying the buffer, this protrusion carrying the elastomer element of the buffer.

Preferably, the rigidity of the elastomer elements of the flexible buffers is significantly higher than that of the isolation studs along the compression axis of the buffer, typically of the order of 5 to 50 times. Thus, characteristic in rigidity of the assembly formed by an isolation stud and a flexible buffer along an axis where both are deformed is such that the relative movements of the two rigid components of the isolation module are attenuated along this axis according to characteristics specific to the two operating regimes: buffer inactive and buffer active, respectively corresponding to the small and large relative movements of said rigid components, with a smooth transition between the two regimes. This smooth transition is provided by the rigidity characteristics of the three following elements: the elastomer isolation stud along at least one of its axes in traction, compression or shear, the elastomer part of the flexible buffer acting in compression along the deformation axis of said stud, and the rigid part of the structural component facing the flexible buffer.

For small movements, only the rigidity of the isolation stud or studs along at least one of its or their deformation axes is active, following an advantageously linear characteristic. For larger movements, when at least one flexible buffer becomes active, the rigidity of its elastomer element acts in parallel with the rigidity of the isolation stud or studs and becomes dominant. When the compression becomes large, the elastomer element of the active flexible buffer or buffers reaches its non-linear rigidity characteristic, then its deformation limit. At this point, any additional load induces a deformation of any metal part of the flexible buffer supporting its or their flexible elements, and of the part of the metal component facing the flexible buffer. In order to take advantage of a certain flexibility of these metal parts for attenuating the high dynamic loads, it will be advantageous for the cross section of the elastomer part of the flexible buffer to be of suitable dimensions: not too big in order to provide a certain flexibility, not too small in order to avoid any non-elastic deformation, or even rupture. In this respect, said cross section represents an adjustment element for the device.

In a first advantageous embodiment, the isolation device according to the invention is such that said external component of each module is U-shaped, which allows the various isolation studs and flexible buffers to be easily installed between the internal and external components.

In addition, said elastomer element of said three flexible buffers of at least one module can be fixed onto said external component. In this case, said elastomer elements of said three flexible buffers of at least one module, and preferably each one of them, are advantageously combined into a single layer of elastomer fixed with no discontinuity onto an internal surface of the external component. Even more advantageously, the assembly formed from said isolation stud or studs and from said elastomer elements of said three flexible buffers of at least one module is formed from one single elastomer block with no discontinuity, which facilitates the construction of the isolation modules.

It can then be advantageous that at least one of said buffers of at least one module, and preferably of each one of them, cooperate with a rigid part which is formed, for example, from a metal protrusion from the internal component of said module.

It is furthermore advantageous, in order to simplify the design of the device, that said isolation modules be substantially identical. Each isolation module can comprise a single elastomer isolation stud, which is longitudinal. But preferably, each module comprises two longitudinal elastomer isolation studs, disposed on either side of the internal component in a substantially symmetrical position, the two studs being of the same geometry and same rigidity.

In the preceding example, it may also be advantageous for each isolation module to additionally comprise a lateral elastomer isolation stud. This lateral stud is preferably disposed with its compression axis substantially parallel to that of the lateral flexible buffer.

In another variant, each isolation module comprises a single elastomer isolation stud, which is lateral.

Advantageously, in the embodiments presented hereinabove, the two longitudinal flexible buffers are disposed in a substantially symmetrical manner, and have the same characteristics at least in terms of rigidity, play and contact surface area.

In each isolation module, it is possible for the angle between the direction of action of each longitudinal buffer and the direction of action of the lateral buffer to be equal to 90°.

However, as a variant, it is equally possible, and even advantageous, for the angle between the direction of action of each longitudinal buffer and the direction of action of the lateral buffer to be different from 90°, but non-zero, and typically greater than 10°.

Furthermore, in each isolation module, it is advantageous for the axes of the longitudinal buffers and of the longitudinal isolation stud or studs to be substantially parallel.

Similarly, in each isolation module, the axis of the lateral buffer and the axis of the lateral isolation stud are advantageously substantially parallel. Furthermore, in each isolation module, it is advantageous for the longitudinal buffers to be the furthest possible from the mounting point of the equipment or of its support.

In these different variants, the device is advantageously balanced if, in addition, it comprises or is formed from three identical modules disposed at the corners of a triangle, preferably equilateral.

However, in order to facilitate the assembly and the adjustment, the device can also comprise or be formed from four identical modules preferably disposed at the corners of a square and preferably oriented symmetrically along the diagonals of the square.

Advantageously, in all the variant embodiments, the mounting planes of the internal components of the modules onto the equipment or onto the equipment support can be substantially coincident.

Similarly, in order to simplify the construction, the isolation studs and the flexible buffers have at least one standard shape, preferably substantially cylindrical or parallelepipedal, the dimensions of the various studs and buffers not necessarily being identical.

As a variant, the isolation studs and the flexible buffers plug into one another, one being for example a cylinder and the other a ring or annular part surrounding the cylinder, in such a manner as to optimize the size of the device.

According to preferred variant embodiments, the angles between, on the one hand, the mid-planes of the external parts of said internal components facing said external components and, on the other hand, the installation plane of the equipment are non-zero or, on the contrary, are zero.

Thus, it is possible that said angles, preferably equal, are such that the center of gravity of the equipment to be isolated is situated close to the mid-planes of said internal components of the isolation modules in order, advantageously, to favor the isolation of the tilting modes of the equipment.

However, it is equally possible that, on the contrary, said angles, preferably equal, are such that the center of gravity of the equipment to be isolated is situated, preferably, far away from the mid-planes of said internal components of the isolation modules in order, advantageously, to favor the frequency decoupling between the suspension modes of the isolation device and the resonant vibration modes of the equipment.

In all the variant embodiments, it is advantageous for the suspension modes of the isolation device to be lower than those of the equipment to be isolated by a minimum of a factor of 2.

Furthermore, advantageously, the characteristics of the isolation studs, in terms of cross section, height, visco-elastic modulus, angles between the longitudinal studs and the midplane of the internal component, angles between the midplanes of the internal components and the installation plane of the equipment on the internal components of said isolation modules, are chosen so as to ensure that the transmissibility frequency functions of the force and torque efforts along the three axes of a triple-axis reference system for small movements, below the active position of the flexible buffers, correspond to a specified bandwidth, in such a manner that, for example, the vibrations with low amplitudes in force and torque transmitted by the equipment to the supporting structure are correctly filtered beyond a certain frequency, and that the useful forces and torques generated by the equipment are transmitted without detrimental deformation.

In an analogous manner, the characteristics of the flexible buffers, in terms of cross section, elastomer height, visco-elastic modulus of the elastomer, dimensions of the gap between the flexible buffer and the facing component, are such that too great a deformation of the isolation studs when high loads are applied to the device is advantageously avoided, thus preventing any deterioration or undesirable irreversible phenomenon, and simultaneously, the transmissibility frequency functions of the force and torque efforts along the three axes over the whole range of operation for which the device is designed correspond to a specified bandwidth, in such a manner that the vibrations and shocks with high amplitudes in force and torque transmitted by the supporting structure to the equipment are advantageously correctly filtered.

Also advantageously, the play in the longitudinal buffers (or gap between each of them and the facing component) of each isolation module may represent only about 0.5% to a few percent (%) of the shortest distance that separates two longitudinal buffers of two separate isolation modules, for example neighboring modules.

The isolation device may, advantageously, additionally comprise at least one flexible thermal drain joining the internal and external components of at least one isolation module, in order to transfer efficiently the heat from the equipment to the supporting structure.

In addition, as a variant, the internal components of the isolation modules can form one body and be one single part with said equipment or equipment-holder support.

Furthermore, advantageously, the elastomer used for the isolation studs and for the flexible buffers is the same.

The invention also relates to an application of the isolation device, such as is presented hereinabove, which is characterized in that the equipment is a piece of equipment for space applications installed on board a satellite, said equipment comprising at least one rotating part generating vibrations, such as for example at least one of the following pieces of equipment: reaction wheel, momentum wheel, inertia wheel, flywheel, control moment gyroscope (or CMG), said equipment fitted with its isolation device having to withstand static and dynamic loads such as vibrations and shocks to which it is subjected when the satellite is launched.

The application of the isolation device can also be such that the equipment is a piece of equipment for space applications installed on board a satellite, said equipment comprising at least one part subjected to a translational movement comprising at least one periodic time component generating vibrations, such as for example a compressor used to drive a refrigerator, said equipment fitted with its isolation device having to withstand static and dynamic loads such as vibrations and shocks to which it is subjected when the satellite is launched.

In such an application of the isolation device, the isolation device can be used to isolate an assembly of equipment at least one piece of which is a source of interference, all being mounted onto the same equipment-holder platen, or else the device may be used to isolate one part of the satellite, for example a service module, from another part of the satellite, for example a payload.

BRIEF DESCRIPTION OF THE DRAWINGS

Other features and advantages of the invention will become apparent from the description presented hereinbelow of non-limiting exemplary embodiments described with reference to the appended drawings, in which:

FIG. 1b shows the curve of rigidity of the assembly of the elastomer isolation stud and of a flexible buffer parallel to the stud in the module of FIG. 1a;

FIG. 6 is a view analogous to FIG. 2 of a fourth example of a module of an isolation device, which is a variant of those in FIGS. 2 and 5;

FIG. 7a is a schematic view of an example of an isolation device equipped with modules according to FIG. 6, whose flexible buffers are not shown in order to simplify the drawing;

FIG. 7b is a schematic view of a fifth example of an isolation module, which is a variant of that in FIG. 2, with an inclination of the external part of the internal component of the module;

FIG. 8 is a schematic view of a variant of the isolation device according to FIG. 7a;

FIG. 11 is a view analogous to FIG. 5 of yet another example of a module of an isolation device according to the invention;

FIG. 14 is a view analogous to FIG. 7a of an isolation device equipped with modules according to FIG. 5, showing the deformation of the isolation studs and the effect of the longitudinal flexible buffers when the equipment is tilted with respect to the supporting structure;

DETAILED DESCRIPTION OF THE INVENTION

Figure 1A:
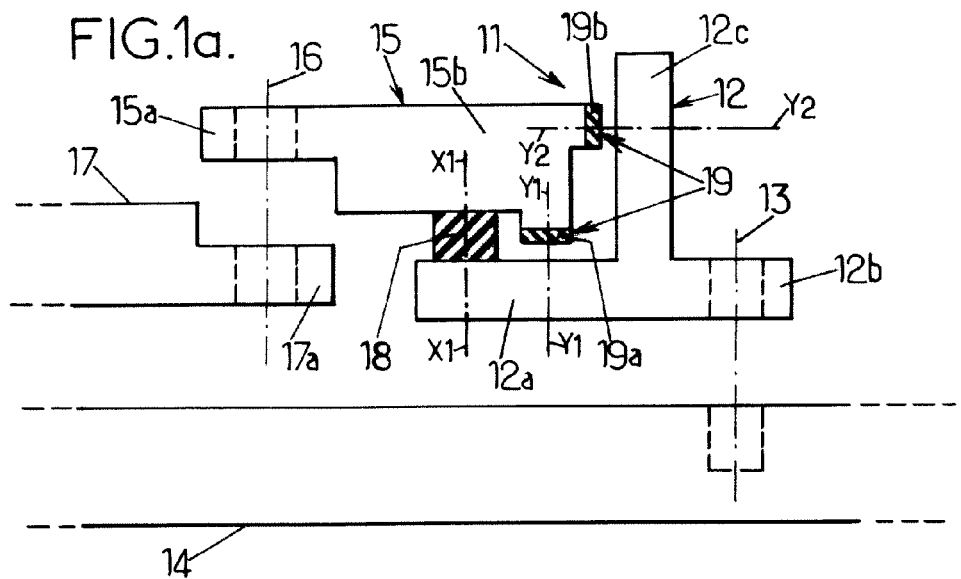
FIG. 1a is a schematic view, in part in lateral elevation and in part in cross section, of a first partial example of a module of an isolation device according to the invention, which is mounted between a supporting structure and an equipment-holder supporting at least one vibrating piece of equipment, in order to explain the curve in FIG. 1b.

FIG. 1a is presented by way of example in order to explain the basic principle of the invention. This figure shows schematically a module 11 of a modular multi-axis isolation device according to the invention for equipment that generates vibrations (not shown) installed on board a satellite and mounted on an equipment-holder platen 17 which is suspended, by several modules 11 that are advantageously identical to one another, from a supporting structure 14, such as the internal structure of a service module of the satellite.

As shown hereinafter on other practical applications of the principle of the invention, this device has the advantage of the isolation modules 11 being independent of one another and very simple to design, construct and assemble on the periphery of the vibrating equipment and of the platen 17 carrying it. Each module 11 is essentially composed of a rigid component referred to as external 12, in this example having the general shape ⊥, but generally able to be U-shaped, which is to be mounted onto the supporting structure 14 of the satellite by a connection for example screwed or bolted on that is shown schematically at 13 by the axis of this connection to the wing referred to as external wing 12b of the external component 12, and a rigid component referred to as internal 15, having a part referred to as internal part 15a which is fixed to the vibrating equipment or its support, namely the equipment-holder platen 17, by a screwed or bolted connection also not shown in detail, but shown schematically at 16 by the axis of this connection from the internal part 15a to a mounting flange 17a of the platen 17, and another part, referred to as external part 15b of the internal component 15 is connected to the external component 12 by means of one or more isolation studs 18 made from elastomer, in this example by a single longitudinal stud 18 connected to the internal wing 12a of the external component 12, the internal component 15 having no permanent contact with the external component 12 other than this or these isolation studs 18, whose deformations in compression-traction along its or their longitudinal axis $X_1 X_1$ and/or in shear in a plane perpendicular to the axis $X_1 X_1$, allow the transmission of low-amplitude vibrations and shocks generated by the equipment on the platen 17 to the supporting structure 14, corresponding to low-amplitude relative movements of the external 12 and internal 15 components of the module 11, to be attenuated.

In order to limit the deformations of at least one isolation stud such as the stud 18, at least in compression along its axis $X_1 X_1$, and/or in shear along an axis perpendicular to $X_1 X_1$, when the supporting structure 14 is subjected to high accelerations when the satellite is launched, and, at the same time, to absorb the shocks and vibrations transmitted to the equipment mounted on the platen 17, during this phase, each module 11 of the isolation device also comprises, in this example, two flexible buffers 19, one of which 19a, referred to as longitudinal, is disposed parallel to the isolation stud 18, in other words such that its axis of compression $Y_1 Y_1$ is substantially parallel to the axis $X_1 X_1$ of the stud 18, and reasonably close to the stud 18. Each flexible buffer 19 comprises at least one part made from elastomer, whose rigidity is much higher than that of the isolation stud or studs 18, typically in a ratio from around 5 to around 50. Each flexible buffer 19 could also comprise a rigid reinforcement, forming one body (by a permanent fixing system for example) with only one of the internal 12 and external 15 components of the corresponding isolation module 11, and supporting at least one layer of elastomer covering this rigid reinforcement. The elastomer part of each flexible buffer 19 has its free end facing the other internal 15 or external 12 component of the module 11 to which this buffer 19 is not fixed and has no contact with this other component 15 or 12, when the device is at rest and the flexible buffer 19 therefore in the inactive position.

In this example, each of the two flexible buffers 19 is fixed to the external part 15b of the internal component 15, one 19a on the face of this external part 15b to which the stud 18 is also fixed, and in such a manner that its axis of compression $Y_1 Y_1$ is parallel to the axis of compression-traction $X_1 X_1$ of the stud 18, and its free end facing the internal wing 12a of the external component 12, and the other is a lateral flexible buffer 19b, substantially in the lateral extension of the external part 15b, and with its axis of compression $Y_2 Y_2$ substantially perpendicular to the axes $X_1 X_1$ and $Y_1 Y_1$ and whose free end is facing the branch 12c of the external component 12.

The contact of the flexible buffer 19a through its elastomer element with the internal wing 12a of the external component 12, in the active position of the buffer 19a, is only established for a sufficient deformation in compression of the isolation stud 18, this deformation being greater than the maximum deformations in compression encountered during normal operation of the equipment on the satellite in orbit.

The contact of the lateral flexible buffer 19a with the branch 12c of the external component 12 is only established for a sufficient deformation in shear of the isolation stud 18, which is very much greater than the maximum shear deformations encountered during normal operation of the equipment on the satellite in orbit.

In the active position of one and/or the other of the flexible buffers 19a and 19b, the compression of their elastomer element allows the transmission of the high-amplitude shocks and vibrations, from the supporting structure 14 to the equipment on the platen 17, to be attenuated notably during the launch of the satellite.

This isolation device is consistent with the invention if, for each module, a second longitudinal flexible buffer such as 19a is mounted on the upper face (in FIG. 1a) of the external part 15a of the internal component 15, for example symmetrically to the buffer 19a. The isolation device is thus composed of at least three isolation modules 11, each composed of an internal component 12 and of an external component 15 connected by one or more elastomer isolation studs 18 and, parallel to deformation directions of this stud or of at least one of these studs 18, of three flexible buffers 19 having at least one elastomer part, and, thanks to a combined rigidity of at least one isolation stud 18 along at least one of its axes of deformation and of at least one associated flexible buffer 19, whose axes of compression such as $X_1 X_1$ and $Y_1 Y_1$ are substantially parallel to said axis of deformation, which combined rigidity is low to the small relative movements of the components 12 and 15, high to the large relative movements of these components 12 and 15, and with no discontinuity but with a gradual and smooth transition between the two operating regimes respectively corresponding to these small and large movements, allows both the attenuation of the effects of high accelerations (shocks and vibrations) applied to the supporting structure 14 of the satellite during the launch phases of the satellite, and the attenuation of the small vibrations generated by the equipment on the platen 17, and transmitted to the supporting structure 14, during normal operation of the equipment on the satellite in orbit.

Figure 1B:
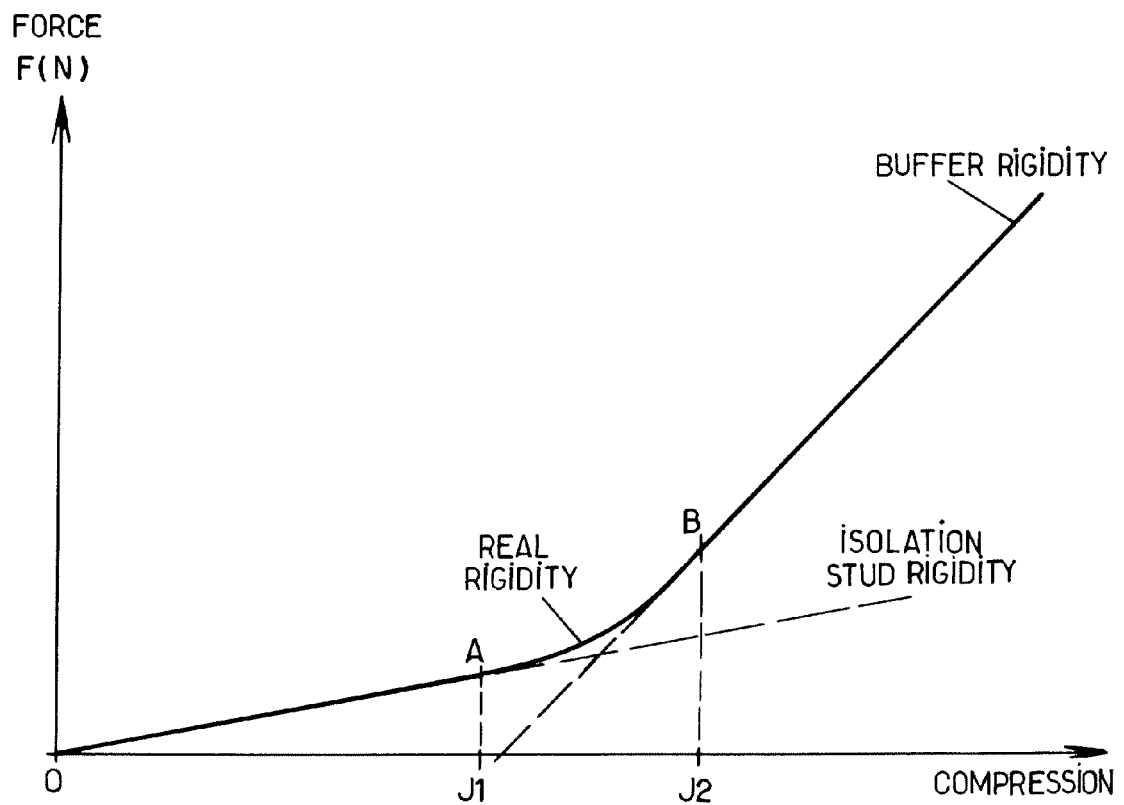

FIG. 1b shows schematically a curve of combined or real rigidity of an assembly of the module 11 consisting of an isolation stud 18 being deformed along at least one deformation axis either in compression or in shear, and a flexible buffer 19a or 19b whose compression is effected parallel to said deformation axis of said isolation stud, this curve firstly exhibiting a linear part with gentle slope at the smaller relative excursions of the components 12 and 15 when only the isolation stud 18 is deformed and the buffer 19 remains inactive, corresponding to the rigidity of the isolation stud 18 along said deformation axis and represented by the segment OA, then, starting from the displacement $J_1$ corresponding to the play in the buffer 19a, and which renders the latter active, the rigidity varies according to the arc AB, representing the non-linear rigidity produced essentially by the elastomer part of the buffer 19 with a progressive increase in the rigidity resulting from the increase in its compression, then, starting from the displacement $J_2$ corresponding to the maximum compression of the elastomer of the buffer 19, the rigidity varies according to the straight line segment beyond B with the very high rigidity of the elastomer compressed to the maximum and of the reinforcement of the buffer 19a, which reinforcement does not have an infinite rigidity, no more, in fact, than does the internal component 15 supporting it, and the external component 12 against which the buffer 19 is compressed, resulting in this linear rigidity part of the curve with a steep slope. It should be noted that the internal 15 and external 12 components, which are generally made of metal, are classed as 'rigid' because their rigidity is very much higher than that of the elastomer of the studs 18 and flexible buffers 19, but this rigidity of the components 12 and 15 is not however too high, so as to provide a cushioning effect when the buffer 19 reaches its compression limit. Moreover, the transverse section of each flexible buffer 19 is not too large such that the rigidity of the facing metal part on the component 12 or 15 to which the buffer 19 is not fixed, is acceptable and participates in the attenuation of the high-amplitude shocks and vibrations.

One of the advantages of the invention, in addition to those that will become apparent hereinbelow in the course of the description, is indeed to achieve these two apparently contradictory objectives: attenuation of small vibrations and attenuation of large vibrations, by means of one and the same simple and very compact device, even though the ratio between the two vibrational regimes in terms of acceleration, for example, is a factor of 100 to 1000.

Figure 3:
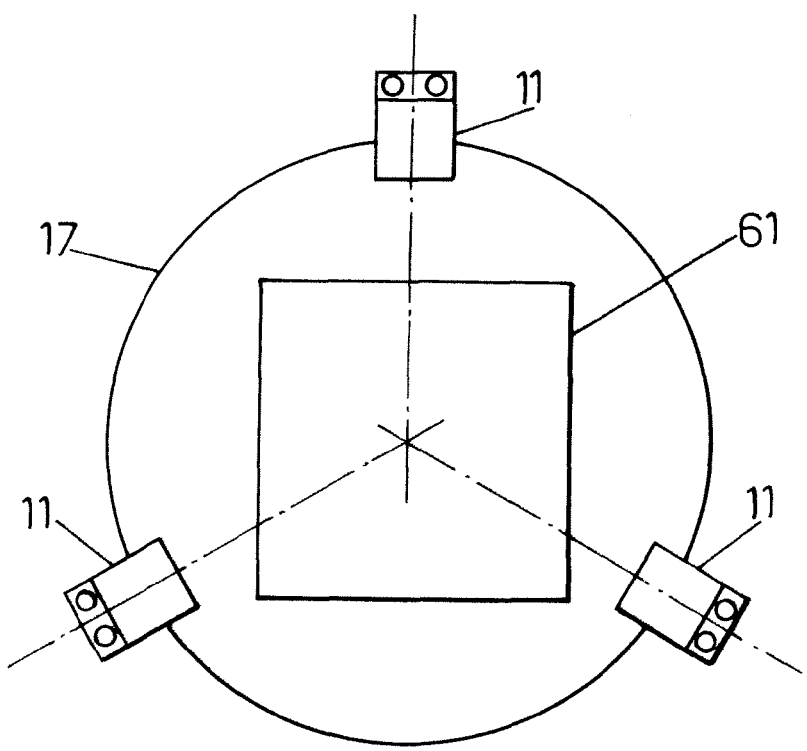
FIG. 3 is a schematic plan view partially showing an isolation device with three modules according to the invention.

In one very simple embodiment of the device, the latter is composed of at least three isolation modules 11, advantageously identical, although this is not obligatory, independent in their mounting onto the supporting structure 14 of the satellite and distributed around this structure 14, and disposed for example at the corners of a triangle, advantageously equilateral, as illustrated in FIG. 3, which provides a multi-axis isolation of the vibrating equipment 61 mounted on the equipment-holder platen 17.

Figure 2:
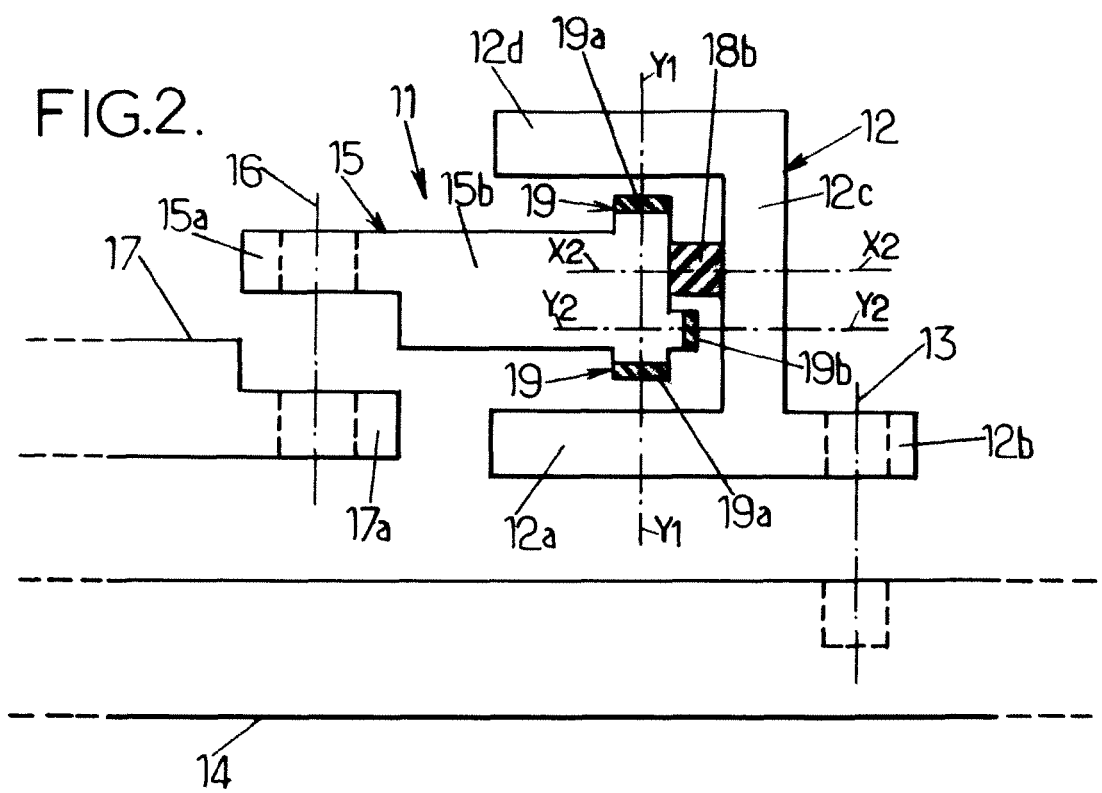
FIG. 2 is a view analogous to FIG. 1a of a second example of an isolation module of a device according to the invention.

In the second exemplary embodiment according to the invention, shown in FIG. 2, each module 11 also comprises:
- one external, relatively rigid, component 12, for example made of metal, but in this example having a U-shape with two internal parallel wings 12a and 12d at the ends of the branch 12c, and one external wing 12b designed to be fixed by the connection shown schematically at 13 onto the supporting structure 14 of the satellite,
- one internal, relatively rigid, component 15, of metal for example, one internal part 15a of which is designed to be fixed by the connection shown schematically at 16 onto the vibrating equipment or onto the equipment-holder platen 17 supporting it, the internal component 15 also having an external part 15b which is engaged in the U-shaped part 12a-12c-12d of the external component 12, and
- one isolation stud made from elastomer 18, called lateral stud 18b since fixed laterally in the extension of the external part 15b of the internal component 15, connecting the face of this external part 15b which is turned toward the branch 12c to this branch 12c of the external component 12, the two internal 15 and external 12 components having no permanent contact at rest other than this lateral isolation stud 18b.

This module 11 also comprises three flexible buffers 19, each one having the same structure as that of the buffers 19 described hereinabove with reference to FIG. 1a, and all three being fixed, in this example, to the single internal component 15 and having the free end of their elastomer part facing, with a small gap, one of the opposing faces of the wings 12a and 12d, respectively, and the branch 12c of the external component 12, and a first flexible buffer 19b of which is called lateral since disposed parallel to the lateral isolation stud 18b (in other words with the axis of compression $Y_2 Y_2$ of this first buffer 19b which is parallel to the axis of traction-compression $X_2 X_2$ of the lateral stud 18b), so as to limit the compression of the lateral stud 18b, and whose two other flexible buffers 19a, referred to as longitudinal, are disposed on either side of the external part 15b of the internal component 15, so as to limit the shear deformations of the lateral isolation stud 18b, the two longitudinal flexible buffers 19a being advantageously disposed in symmetrical positions with respect to the mid-plane of the external component 15, in the direction of their common axis of compression $Y_1 Y_1$, which is a direction perpendicular to the axes of compression $X_2 X_2$ and $Y_2 Y_2$ of the lateral isolation stud 18b and of the lateral flexible buffer 19b.

In one embodiment of the isolation device with three modules 11 according to FIG. 2, the isolation of the vibrations passing through the device via the six degrees of freedom in forces and torques, for the small movements, for which the flexible buffers 19a and 19b remain inactive, is achieved thanks to the deformations of the lateral isolation studs 18b along the three axes $X_2 X_2$ of traction-compression (1 axis $X_2 X_2$ per stud 18, hence per module 11) and the 6 shear axes (2 per stud 18, hence per module 11, one axis being parallel to $Y_1 Y_1$ and one axis being perpendicular to $Y_1 Y_1$ and $X_2 X_2$), and for large movements, for which the flexible buffers 19a and/or 19b are active, in contact against the face toward the external component 12, thanks to the deformations in compression of the flexible buffers 19a and 19b along the 9 axes of compression (1 axis such as $Y_1 Y_1$ or $Y_2 Y_2$ per buffer 19).

Figure 4:
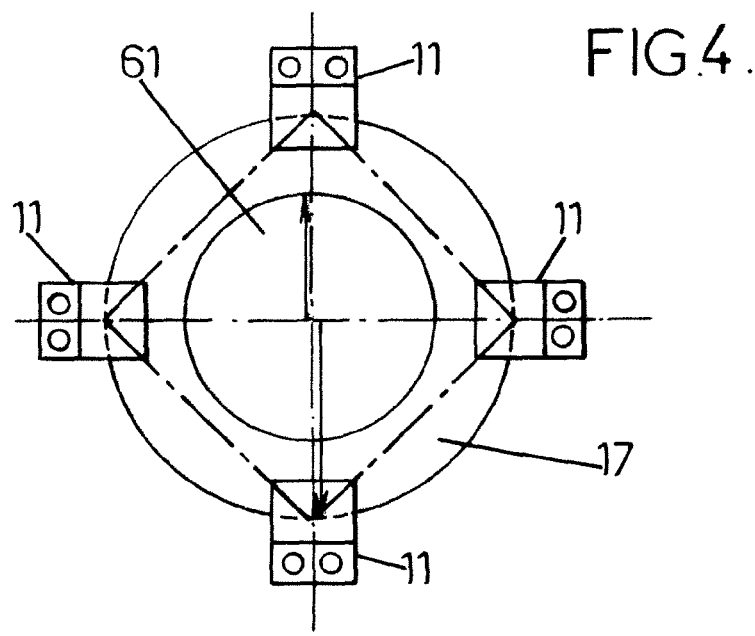
FIG. 4 is a view analogous to FIG. 3 of a device with four isolation modules according to the invention.

In order to simplify the design of this isolation device, it is often advantageous to use four isolation modules 11 instead of 3, still independent as regards their mounting onto the periphery of the equipment on the supporting structure 14 of the satellite, and placed, for example, at the four corners of a square and symmetrically with respect to the diagonals of this square, as shown schematically in FIG. 4, in which the vibrating equipment 61 is shown with a cylindrical shape on a circular disk-shaped equipment-holder 17 supported by the internal components of the four modules 11. In this embodiment of the invention, the various degrees of freedom in forces and in torques are therefore decoupled, and the dimensioning is simpler to achieve. This illustrates the modular nature of the isolation device according to the invention, which represents an important advantage of the invention over the prior art.

Figure 5:
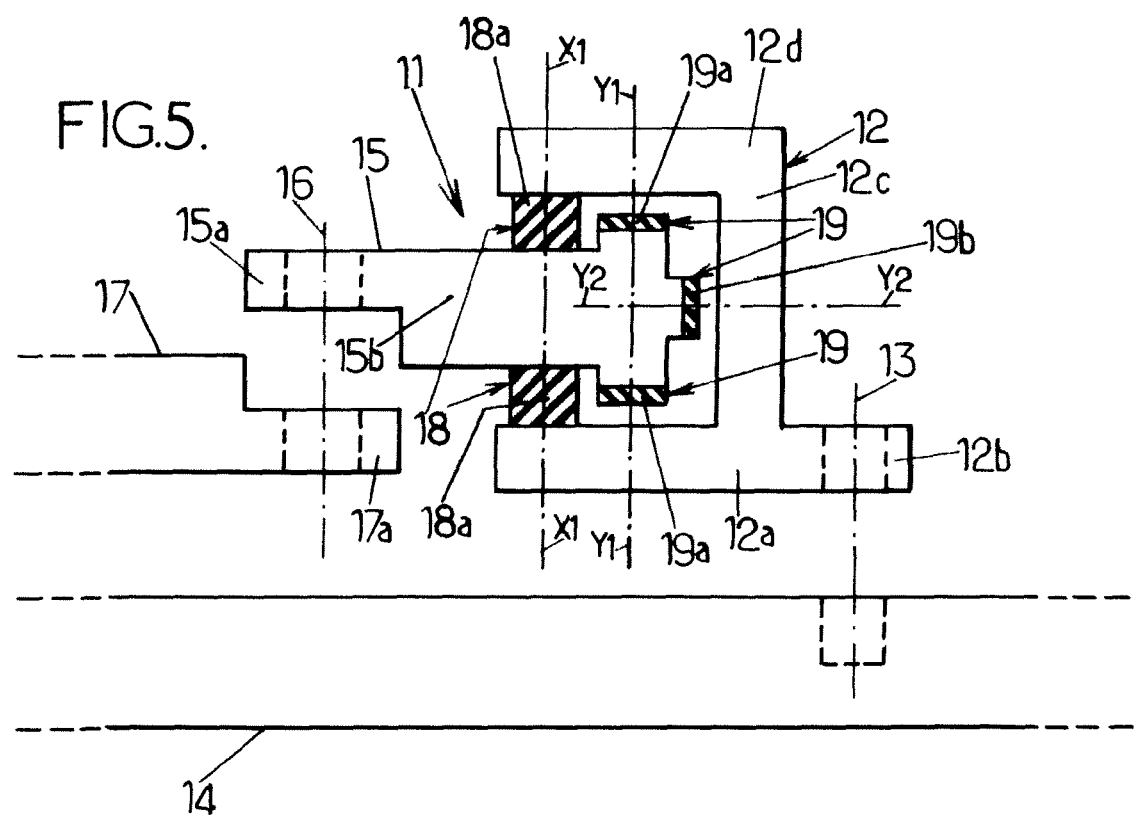
FIG. 5 is a view analogous to FIG. 2 of a third example of a module of an isolation device according to the invention.

One illustration of the flexibility offered by the invention is given by a different embodiment of the device, but still following the same principle of the invention. In this new exemplary embodiment of the device, the latter is composed of a plurality of isolation modules 11 that are advantageously, but not necessarily, identical, for example three modules 11 disposed at the corners of an equilateral triangle, as in FIG. 3, or four modules 11 disposed at the corners of a square, as in FIG. 4, each module 11 being such as is shown in FIG. 5 and comprising:

one external component 12, U-shaped such as that described hereinabove with reference to FIG. 2, and also designed to be fixed by its external wing 12b onto the supporting structure 14 of the satellite via the connection 13;

one internal component 15, of analogous shape to that of the internal component 15 described hereinabove with reference to FIG. 2, and whose internal part 15a is designed to be fixed to the vibrating equipment or to the equipment-holder 17 which supports it via the connection 16, whereas its external part 15b is engaged in the U-shape 12a-12c-12d of the external component 12 and facing the opposing faces on the two wings 12a and 12d and the branch 12c forming the U-shape;

two elastomer isolation studs 18, referred to as longitudinal isolation studs 18a, disposed on either side of the external part 15b of the internal component 15, in a symmetrical fashion, but not necessarily perpendicular to the mid-plane of the internal component 15, the latter having no permanent contact at rest with the external component 12 other than these two longitudinal isolation studs 18a, each one of which is respectively fixed to one of the opposing faces of the external part 15b and to the opposing face of the wing 12a or 12d on the corresponding side, and three flexible buffers 19, each of the same structure as the flexible buffers 19 in FIGS. 1a and 2 and being fixed to or forming one body with either the internal component 15 or the external component 12, and in this example with the single internal component 15, as in FIG. 2, two 19a of these buffers 19 being categorized as longitudinal and disposed in a manner substantially parallel to the longitudinal isolation studs 18a, on either side of the external part 15b of the internal component 15, advantageously in symmetrical positions, and the third flexible buffer 19b, referred to as lateral, being disposed in the lateral extension of the external part 15b of the internal component, its axis of compression $Y_2 Y_2$ being advantageously in the mid-plane of the internal component 15, and advantageously oriented along the bisector of the axes of traction-compression of the two longitudinal studs 18a, which are, in this example, coincident in the common axis of traction-compression $X_1 X_1$. The axis of compression $Y_2 Y_2$ of the lateral flexible buffer 19b is, in this example, perpendicular to the axes of traction-compression $X_1 X_1$ and of compression $Y_2 Y_2$ of the two longitudinal studs 18a and of the two longitudinal flexible buffers 19a, respectively.

In this embodiment of the invention, assuming that 3 modules 11 with 3 flexible buffers 19 are used, the isolation of the vibrations passing through the device via the 6 degrees of freedom in forces and in torques is achieved, for the small movements, thanks to the deformations of the isolation studs 18 along the three axes of traction-compression (one axis such as $X_1 X_1$ per module 11) and the 6 shear axes (2 axes such as $Y_2 Y_2$ and one axis perpendicular to $X_1 X_1$ and $Y_2 Y_2$ per module 11), and for the large movements thanks to the deformations in compression of the flexible buffers 19 along the 9 axes of compression (1 axis such as $Y_1 Y_1$ or $Y_2 Y_2$ per buffer 19).

In this embodiment, it is advantageous for the two longitudinal studs 18a of each isolation module 11 to be exactly identical in terms of geometry and rigidity, which could be assembled in pairs after testing, in order to balance the device.

In one variant of this embodiment, as shown in FIG. 6, in which the same references denote elements that are analogous or identical, each module 11 additionally comprises a third isolation stud 18b, referred to as lateral, connecting the internal component 15 and the external component 12, this stud 18b being disposed, like the stud 18b in FIG. 2, in the extension of the external part 15b of the internal component 15 facing the branch 12c of the U-shape of the external component 12.

For all of the variant embodiments of the invention, it is always advantageous for the mounting planes of the internal components 15 of the isolation modules 11 to the equipment 61 or to the equipment support 17 to coincide, as indicated in a simplified fashion in FIG. 7a which shows schematically an isolation device with several modules 11 according to FIG. 6, whose flexible buffers 19 have not been shown in order to simplify the drawing. These mounting planes are defined in FIGS. 1a, 2 and 5 by the planes of contact of the faces opposite the internal part 15a of the internal components 15 and of the mounting flange 17a of the equipment support 17 by the action of the connection 16, shown in FIG. 7a in the form of a bolted connection.

In addition, it may also be advantageous to consider internal components 12, not having rectilinear shapes as shown for example in FIG. 2, 5 or 6, but, as illustrated on the module 11 in FIG. 7b which corresponds to a variant of that in FIG. 2, such that the mid-plane 22 of the external part 15b of the internal component 15 facing the external component 12 or engaged in the U-shape of the external component 12 makes an a non-zero angle α with the installation plane 21 of the equipment 61 or of its support 17. In this case, the U-shape defined by the wings 12a and 12d and the branch 12c of the external component 12 is inclined at the same angle, in order to ensure the same operation of the lateral stud 18b and of the three flexible buffers 19 (two of which are longitudinal 19a and one lateral 19b) between the external part 15b and the U-shape 12a-12c-12d as in FIG. 2.

Thus, the center of gravity or of mass 62 of the equipment 61 can be brought nearer to the axes of compression $X_2 X_2$ of the lateral isolation studs 18b of the various modules 11 of a device, as shown in FIG. 8, which shows a device equipped with modules 11 according to FIG. 6 with inclined U-shape and external part 15b of the internal component inclined as in FIG. 7b, which specifically favors the attenuation of the effects of the vibration torques generated by the equipment 61 owing to the fact that these torques are taken up essentially by the compression of the isolation studs 18. Similarly, this angle α can be used, on the contrary, to move the center of mass 62 of the equipment 61 further away from the axes of compression of the isolation studs 18, which favors more the frequency decoupling between the equipment 61 and the supporting structure 14. This again illustrates the flexibility in embodiment offered by the invention.

Figure 9:
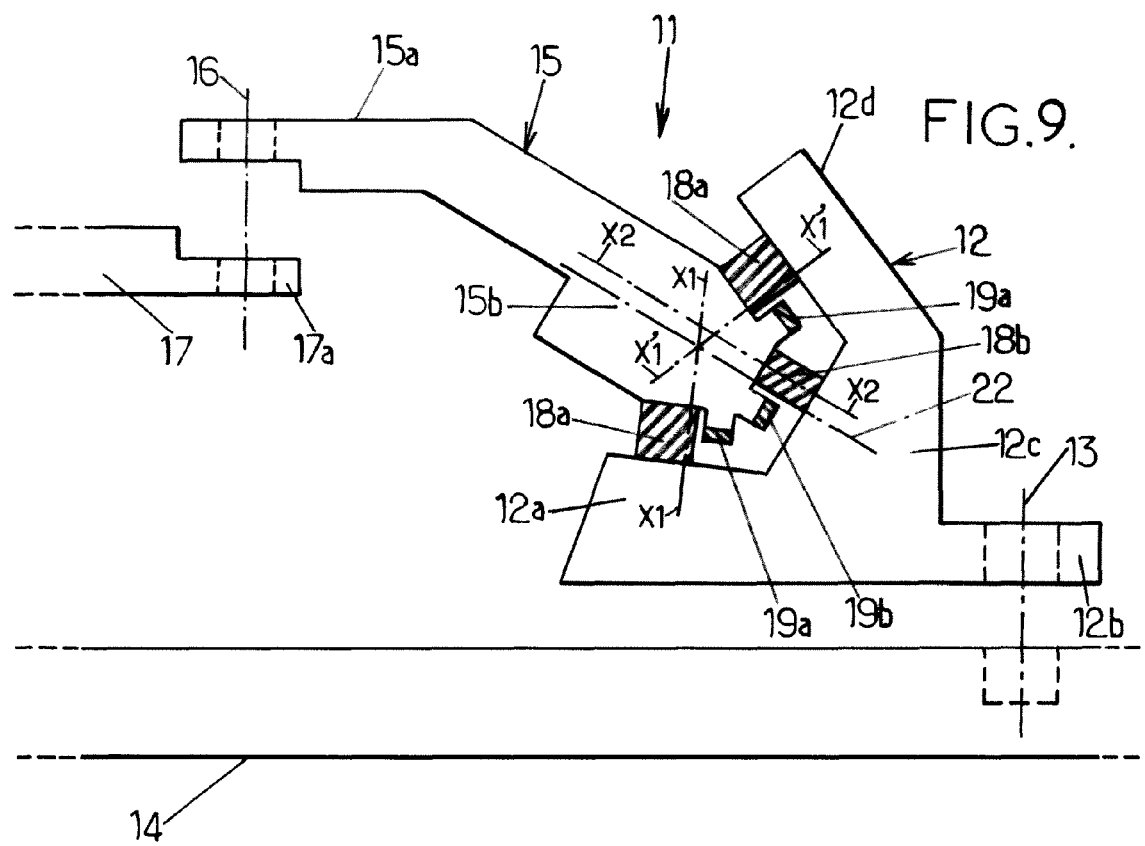
FIG. 9 is a schematic view of a sixth example of an isolation module, which is a variant of those in FIGS. 5 and 7b.

Furthermore, it could be advantageous for all of these variants to have a non-normal angle between the axis such as $X_1 X_1$ and $X'_1 X'_1$ of compression of the longitudinal isolation studs 18a and the axis of compression such as $X_2 X_2$ (which is advantageously the bisector of the angle of the axes $X_1 X_1$ and $X'_1 X'_1$) of the lateral stud 18b or of the lateral studs as the case may be, as illustrated in FIG. 9 which shows a very general type of isolation module 11 according to the invention, corresponding to one variant of the module 11 in FIG. 6 with external part 15b of the internal component 15 and U-shape of the external component 12 that are inclined as in FIG. 7b, but with faces opposing the 2 wings 12a and 12d of the U-shape which are not parallel to one another but form an acute angle, such that the same references denote analogous or identical elements.

Even in this most complete variant, the features of the invention are clearly illustrated: simplicity, compactness, modularity for a device that must fulfill a significant number of functions: attenuation of the small vibrations of the equipment 61, attenuation of the high accelerations applied to the supporting structure 14, transmission of useful torques.

Figure 10:
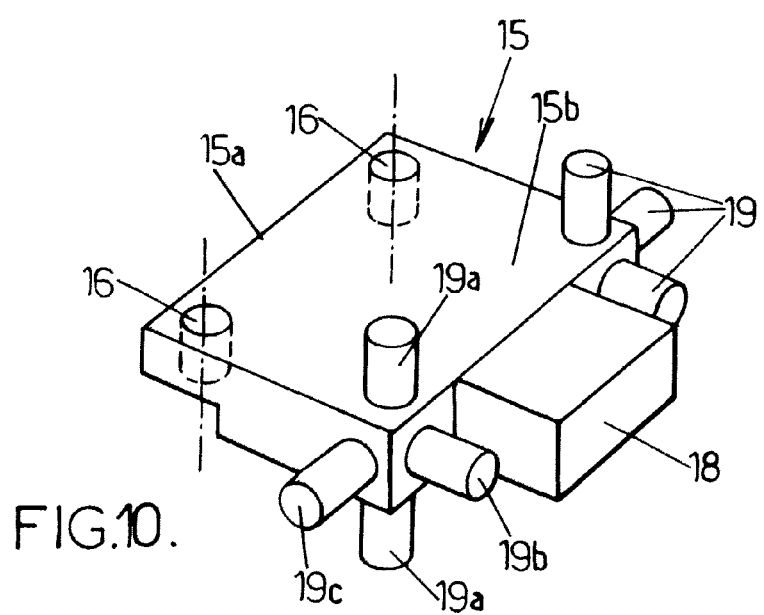
FIG. 10 is a schematic perspective view of the internal component of another example of an isolation device module.

In the case where the equipment 61 to be isolated generates vibrations along a reduced number of degrees of freedom, as is the case, for example, when only spurious forces are generated mainly in a single direction (typically in the case where the equipment 61 is a piston-driven compressor for example), other variants of the device may be designed where only two isolation modules 11 are used to isolate the equipment 61. In this case, the number of isolation studs 18 and of flexible buffers 19 must be sufficient to attenuate both the small vibrations generated by the equipment 61 via the corresponding degrees of freedom and the large vibrations at launch via the 6 degrees of freedom in forces and torques. An illustration of this configuration is given in FIG. 10, where only the internal component 15 of an isolation module is shown, with 8 flexible buffers 19 and one isolation stud 18. The stud 18 is parallel-epipedal in shape and each buffer 19 cylindrical. The internal component 15, of plane rectangular shape, has 2 holes bored in its internal part 15a for connections 16 and, at each of the two corners of its external part 15b, four flexible buffers 19, two of which are longitudinal 19a, symmetrical on either side of the external part 15b, and two lateral 19b and 19c, so as to limit the deformations in compression and in shear of the stud 18 in three directions perpendicular to one another. Two modules 11 of this type placed head-to-foot allow lateral forces to be isolated along the axis of compression of the isolation studs 18, together with spurious forces along the other shear directions of the studs 18, while at the same time withstanding the high accelerations at launch.

Starting from the elements given in this description, those skilled in the art can readily design other configurations that allow the desired isolation characteristics to be obtained in the general case, as a function of the number and type of degrees of freedom in force and/or in torque to be isolated.

From amongst these variants, one preferred variant of configuration of an isolation module of a multi-axis isolation device according to the invention is shown in FIG. 11, in which variant the elastomer elements of the flexible buffers 19a and 19b are mounted on the various internal faces of the external component 12, with no discontinuity between them and forming a single block of elastomer with the longitudinal isolation studs 18a, preferably identical in terms of geometry and rigidity, and disposed in a symmetrical fashion on either side of the internal component 15, the longitudinal flexible buffers 19a cooperating, in the active position, with rigid parts 19c formed by protrusion of the internal component along a direction substantially parallel to that of the longitudinal isolation studs 18a, leaving a gap between the end of the protrusion and the elastomer layer forming the flexible part of the buffers 19, and the rigid part 19c of the internal component 15 cooperating with the lateral flexible buffer 19b simply being, in this case, the external face of the internal component 15, substantially plane and parallel (at rest) to the internal face of the external component 12.

For all these variant embodiments of the invention, the shape or shapes of the isolation studs 18 and of the flexible buffers 19 can be chosen with few constraints, the preferred shapes being parallelepipedal or cylindrical for reasons of simplicity and of linearity to the small movements. For the sake of making the device a little more compact, at least one flexible buffer 19 can be disposed at the center of an isolation stud 18 taking the form of a crown or a part of a crown, for example.

For each of these variants, the characteristics of the isolation studs 18, in terms of cross section, height, visco-elastic modulus, angles between the longitudinal studs 18a and the mid-plane of the internal component 15, angles between the mid-plane of the internal component 15 and the installation plane 21 of the equipment 61 on the internal components 15 of said isolation modules 11, are chosen so as to ensure that the transmissibility frequency functions of the force and torque efforts along the three axes for small movements (below the operational point of the flexible buffers 19) correspond to a specified bandwidth, in such a manner that, for example, the vibrations with low amplitudes in force and torque transmitted by the equipment 61 to the structure 14 of the satellite are correctly filtered beyond a given frequency, and that the useful forces and torques generated by the equipment 61 are transmitted without detrimental deformation up to a given frequency.

Similarly, the characteristics of the flexible buffers 19 in terms of cross section, elastomer height, visco-elastic modulus of the elastomer, dimensions of the gap between the elastomer and the facing component 12 or 15 at rest, are chosen such that too great a deformation of the isolation studs 18 when high loads are applied to the device is avoided, thus preventing any deterioration or undesirable irreversible phenomena, and at the same time, the transmissibility frequency functions of the force and torque efforts along the three axes over the whole range of operation for which the device is designed correspond to a specified bandwidth, in such a manner that, for example, the vibrations and shocks with high amplitudes in force and torque transmitted by the structure 14 of the satellite to the equipment 61 are correctly filtered.

It should be noted that, in order to facilitate the fabrication of the isolation modules 11, it is very advantageous to use the same type of elastomer for the isolation studs 18 and the flexible buffers 19.

In other variants of the device, very flexible thermal drains may be installed between the equipment part 17-61 and the supporting structure 14, in order to promote thermal exchanges which are naturally limited by the elastomer studs 18 installed.

The internal components 15 of the isolation modules 11 may also be constructed in such a manner that the components 15 form one body with the equipment 61 or the equipment-holder platen 17, which renders the device less modular but provides a superior compactness (specification of assignable volume) and capacity for integration.

Figure 12:
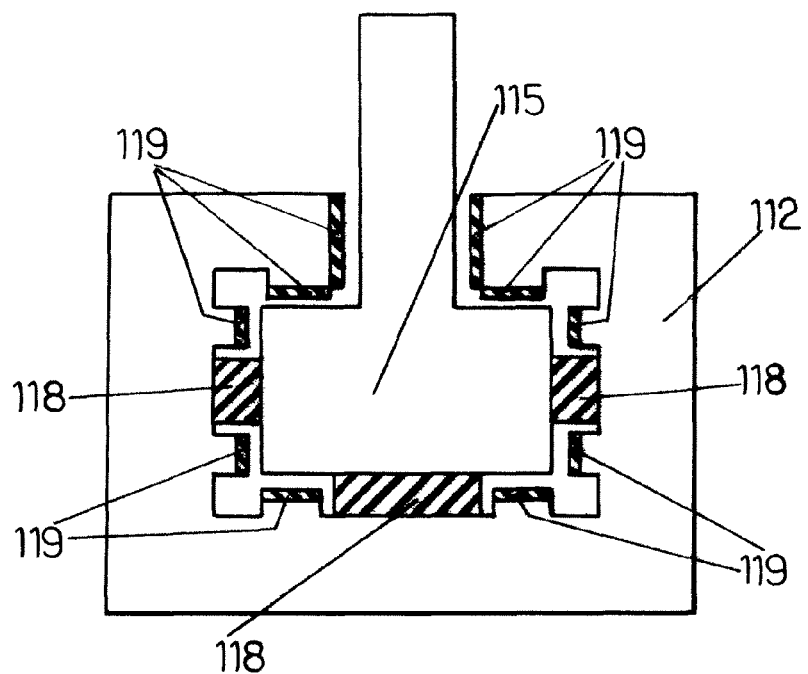
FIG. 12 is a schematic cross sectional view of a device with a mounting insert from the prior art according to JP 2000 145 889.
Figure 13:
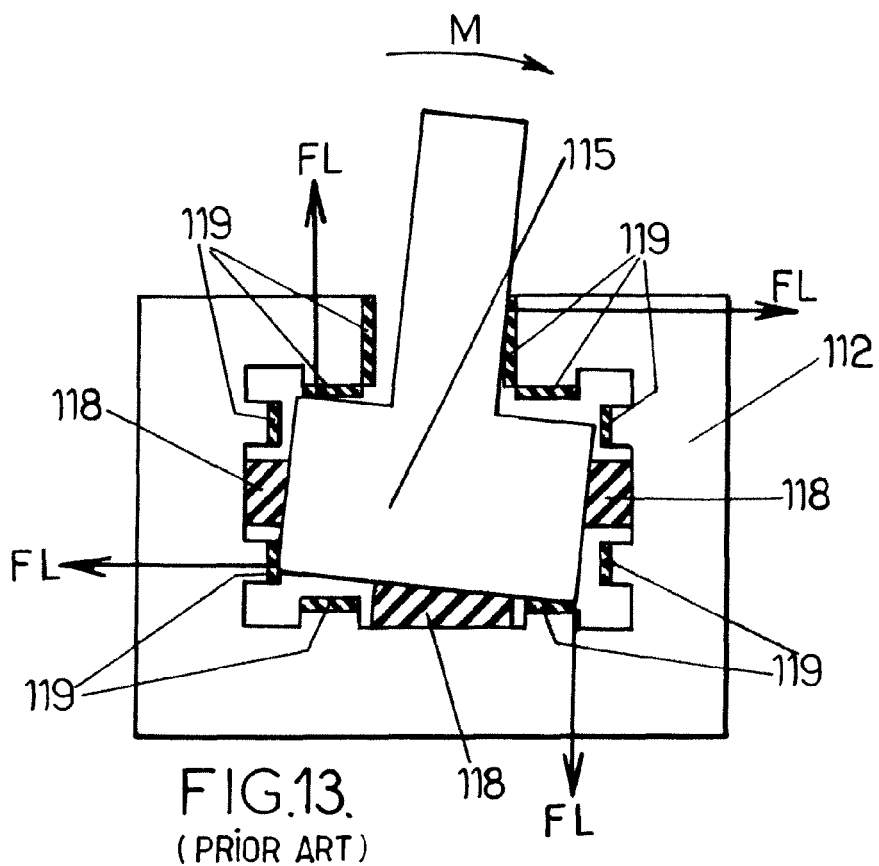
FIG. 13 is a view analogous to FIG. 12 showing the effect of tilting the internal component with respect to the external component of a device with a mounting insert according to the prior art in FIG. 12.

All the variants of the device according to the invention described previously have features in common that are advantageous with respect to the prior art. In order to highlight these advantages, FIG. 12 shows a device from the prior art according to the patent document JP 2000 145889, composed of a mounting insert comprising an internal component 115, whose axis is longitudinal with respect to the equipment and onto which the equipment is mounted, said internal component 115 being connected to an external component 112 fixed onto the supporting structure (not shown here) by a plurality of elastomer isolation studs 118, the principle of the device according to JP 2000 145889 being such that the internal component 115 comes to abut against the external component 112 whenever the stresses applied to the isolation studs 118 reach limit values. According to this principle, in order to block the movements of the internal component 115 along the three translational movements necessarily generated by the displacement of the equipment during the high accelerations experienced at launch along all the axes, a plurality of buffers 119 must be disposed all around said internal component 115, as is shown in FIG. 12 in cross section in a horizontal plane, on which are shown the contact areas of the buffers 119. In this configuration (made therefore necessary according to JP 2000 145889 in order to block all these translations), a rotational movement of the equipment subjected to a high torque M will induce a tilting of the internal component 115 with respect to the external component 112. However, as shown in FIG. 13 which shows the deformations of the device in FIG. 12 under the effect of such tilting, not one, but several buffers 119 will simultaneously go into action, even for small tilt angles, thus creating very high local forces FL, of the order of M/d, where d is the typical distance between two buffers 119, being a few centimeters in this case. Such a design would not withstand violent and repeated impacts that are generated by the accelerations at launch typically going from 20-100 g (where g is the acceleration of the earth's gravitational field) in the range 10-100 Hz (vibrations) and 1000 g in the range 100-1000 Hz (shocks).

With respect to this prior art, one of the advantageous features of the device according to the invention, which could be deduced from FIG. 7a, is illustrated more precisely in FIG. 14, in a simplified but representative case. This FIG. 14, with an overall resemblance to FIG. 7a, shows a schematic view of the device in which only two isolation modules 11 assumed to be active are shown with details of the isolation studs 18a and of flexible buffers 19a and 19b, as in FIG. 5, since those skilled in the art are readily able to generalize to a larger number of modules 11 (at least three according to the invention) and to more complicated movements. This FIG. 14 shows schematically the tilting of the equipment under the effect of a high torque M. The resulting movement is quickly blocked at low tilt angles by two longitudinal buffers 19a of two separate modules 11, with the exclusion of any other point of contact of the other buffers 19 of each module 11, owing to the relatively small play in the longitudinal buffers 19a (typically of the order of a millimeter) with respect to the long lever arm formed by the distance D between two longitudinal buffers 19a of two individual isolation studs 11, being typically from 20 to 40 cm depending on the size of the piece or pieces of equipment to be isolated. In this case, each isolation module 11 is only subjected, at the worst, to simple forces (rather than local torques in contrast to JP 2000 145889), these forces created on the buffers 19 being of the order of magnitude M/D, or typically 10 times lower than in the previous case.

Figure 15:
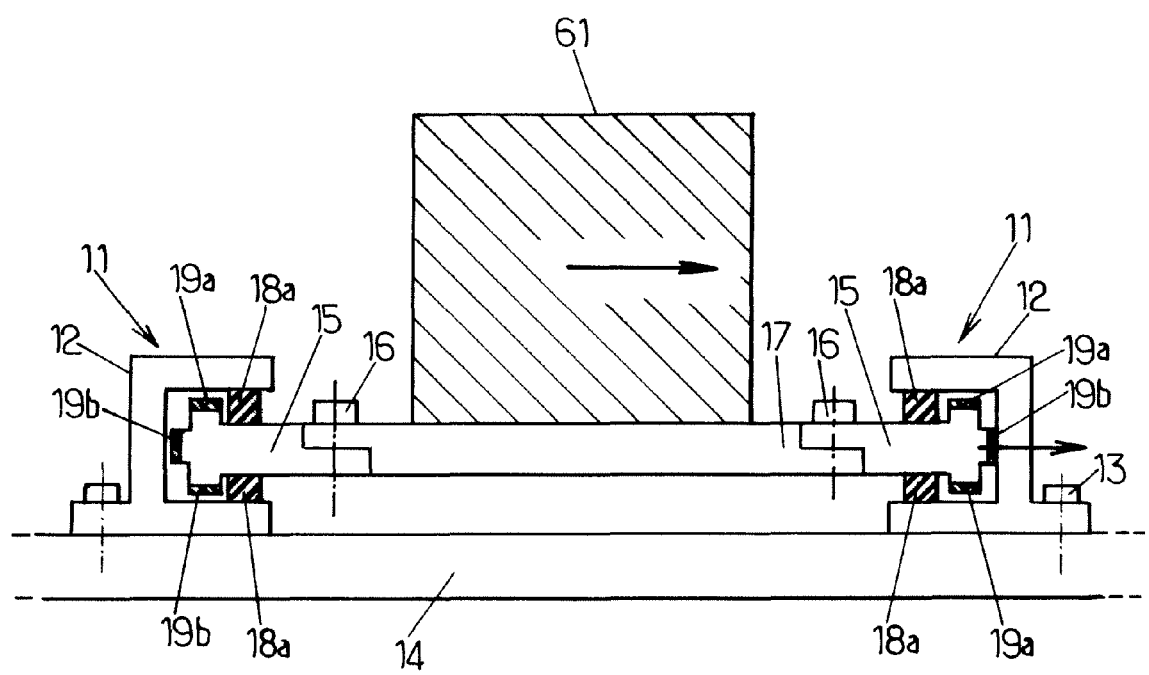
FIG. 15 is a view analogous to FIG. 7a showing the effect of the lateral flexible buffers during a lateral translation of the equipment with respect to the supporting structure.

One other feature that advantageously differentiates the device according to the invention with respect to the prior art, in particular JP 2000 145889, is that, according to the invention, each isolation module 11 only comprises a single lateral buffer 19b and a single buffer 19a in either orientation of the longitudinal direction, representing a limited number of three buffers 19 per module 11 which facilitates the design and the construction of these modules 11. In particular, in contrast to the design rules resulting from the prior art, each isolation module 11 taken alone would not withstand the significant traction forces tending to pull the internal component 15 and the external component 12 apart, since only one lateral buffer 19b is used in compression to block the closing of the gap between the internal component 15 and the external component 12. Owing to the fact that only three buffers 19 are used per module 11, the external components 12 commonly used according to the invention can have a simple U-shape, rather than a jaw shape in all the directions, as is necessary in JP 2000 145889. This feature of the device according to the invention comes from the fact that the lateral buffers 19b of the at least three isolation modules 11 used in the device block, as a whole rather than individually, all the translational movements of the equipment in any lateral direction. This property is displayed schematically in FIG. 15, which shows the same device as in FIG. 14, but here subjected to a lateral translation which is blocked by the lateral buffer 19b of one of the isolation modules 11 well before forces that are too high tear off the isolation studs 18a from the other module 11 which are not protected with respect to such translations.

The invention claimed is:

1. A multi-axis isolation device for at least one equipment that generates vibrations and is adapted to be installed on board a supporting structure, said device comprising at least three isolation modules adapted to be distributed around a periphery of said vibrating equipment or of an equipment holder platen of said equipment, wherein each isolation module comprises two rigid components one of which, called external component, is adapted to be fixed to said supporting structure, and the other of which, called internal component, is adapted to be fixed to said vibrating equipment or to said platen, said internal component and external component being connected to one another by at least one isolation stud made from elastomer, attenuating by at least one stud deformation along at least one of stud axes in traction, compression or shear the transmission of vibrations of low amplitude generated by said equipment each isolation module also comprising a limited number of three buffers consisting of a lateral flexible buffer and two longitudinal flexible buffers, acting in opposing directions, each of said flexible buffers being mounted onto one of said internal and external components only, and having one free end facing the other of said internal and external components and having no contact with said other component at rest.

2. The multi-axis isolation device as claimed in claim 1, wherein said flexible buffers of said isolation modules each comprise at least one element made from elastomer coming into contact with a facing portion of said other component, in an active position of said flexible buffer.

3. The multi-axis isolation device as claimed in claim 2, wherein said at least one elastomer element of said flexible buffers of at least one module is fixed onto said external component.

4. The multi-axis isolation device as claimed in claim 2, wherein said elastomer elements of said flexible buffers of at least one module are combined into a single layer of elastomer fixed with no discontinuity onto an internal surface of said external components.

5. The multi-axis isolation device as claimed in claim 2, wherein an assembly formed from said isolation stud or studs and from said elastomer elements of said three flexible buffers of at least one module is formed from one single elastomer block with no discontinuity.

6. The multi-axis isolation device as claimed in claim 1, wherein said external component is U-shaped.

7. The multi-axis isolation device as claimed in claim 1, wherein at least one flexible buffer of at least one module is formed from an elastomer element, mounted onto only one of said internal and external components, and having one free end facing a part of the other of said internal and external components and having no contact with said other component at rest, said part facing said elastomer element being formed from a metal protrusion from said other internal or external component.

8. The multi-axis isolation device as claimed in claim 1, wherein said isolation modules are identical to each other.

9. The multi-axis isolation device as claimed in claim 1, wherein each isolation module comprises a single elastomer isolation stud, which is longitudinal.

10. The multi-axis isolation device as claimed in claim 1, wherein each said isolation module comprises two longitudinal elastomer isolation studs, disposed on either side of said internal components, in a substantially symmetrical position, said two studs being of a same geometry and of a same rigidity, wherein each isolation module additionally comprises a lateral elastomer isolation stud and in each said isolation module, the axis of said lateral buffer and the axis of said lateral isolation stud are substantially parallel.

11. The multi-axis isolation device as claimed in claim 1, wherein each said isolation module comprises a single elastomer isolation stud, which is lateral.

12. The multi-axis isolation device as claimed in claim 1, wherein said two longitudinal flexible buffers are disposed in a substantially symmetrical manner and have same characteristics at least in terms of rigidity, play and contact surface area.

13. The multi-axis isolation device as claimed in claim 1, wherein, in said each isolation module an angle between a direction of each said longitudinal buffer and a direction of said lateral buffer is equal to 90°.

14. The multi-axis isolation device as claimed in claim 1, wherein, in each said isolation module an angle between a direction of each said longitudinal buffer and a direction of said lateral buffer is different from 90°, and non-zero.

15. The multi-axis isolation device as claimed in claim 1, wherein, in each said isolation module, the axes of at least one longitudinal buffer and of said longitudinal isolation stud are substantially parallel.

16. The multi-axis isolation device as claimed in claim 1, comprising three identical modules, disposed at the corners of a triangle.

17. The multi-axis isolation device as claimed in claim 1, comprising four identical modules disposed at the corners of a square and oriented symmetrically along the diagonals of the square.

18. The multi-axis isolation device as claimed in claim 1, wherein mounting planes of said internal components of said modules onto the equipment or onto the equipment holder platen are substantially coincident.

19. The multi-axis isolation device as claimed in claim 1, wherein said at least one isolation stud and flexible buffers have at least one standard shape, selected from the group consisting of substantially cylindrical and parallelepipedal shapes.

20. The multi-axis isolation device as claimed in claim 1, wherein said at least one isolation stud and flexible buffers plug into one another.

21. The multi-axis isolation device as claimed in claim 1, wherein angles between mid-planes of external parts of said internal components facing said external components and an installation plane of the equipment are zero.

22. The multi-axis isolation device as claimed in claim 1, wherein angles between mid-planes of external parts of said internal components facing said external components and an installation plane of the equipment are non-zero.

23. The multi-axis isolation device as claimed in claim 22, wherein said angles, are such that the center of gravity of the equipment to be isolated is situated close to said mid-planes of said internal components of said isolation modules in order to favor the isolation of the tilting modes of the equipment.

24. The multi-axis isolation device as claimed in claim 22, wherein said angles are such that the center of gravity of the equipment to be isolated is situated far away from said mid-planes of said internal components of said isolation modules in order to favor the frequency decoupling between the suspension modes of the isolation device and the resonant vibration modes of the equipment.

25. The multi-axis isolation device as claimed in claim 1, wherein said isolation device has suspension modes which are lower than the suspension modes of the equipment to be isolated by a minimum of a factor of 2.

26. The multi-axis isolation device as claimed in claim 1, wherein characteristics of said at least one isolation studs in terms of cross section, height, visco-elastic modulus, angles between any longitudinal stud and a mid-plane of said internal component, angles between mid-planes of said internal components and an installation plane of the equipment on said internal components of said isolation modules, are chosen so as to ensure that transmissibility frequency functions of force and torque efforts along three axes of reference for small movements, below an active position of said flexible buffers, correspond to a specified bandwidth, in such a manner that the vibrations with low amplitudes in force and torque transmitted by the equipment to the supporting structure are correctly filtered beyond a certain frequency, and that the useful forces and torques generated by the equipment are transmitted without detrimental deformation.

27. The multi-axis isolation device as claimed in claim 1, wherein characteristics of said flexible buffers, in terms of cross section, elastomer height, visco-elastic modulus of the elastomer, dimensions of a gap between any flexible buffer and a facing component, are such that too great a deformation of said at least one isolation stud is avoided, when high loads are applied to the device, thus preventing any deterioration or undesirable irreversible phenomenon, and simultaneously transmissibility frequency functions of force and torque efforts along three axes of reference over a whole range of operation for which the device is designed correspond to a specified bandwidth, in such a manner that vibrations and shocks with high amplitudes in force and torque transmitted by the supporting structure to the equipment are correctly filtered.

28. The multi-axis isolation device as claimed in claim 1, wherein a play in between said longitudinal buffers and the other of the external and internal components onto which said longitudinal buffers are mounted of each said isolation module only represents 0.5% of the shortest distance that separates two said longitudinal buffers of two adjacent separate isolation modules.

29. The multi-axis isolation device as claimed in claim 1, additionally comprising at least one flexible thermal drain joining said internal and external components of at least one said isolation module, in order to transfer heat from the equipment to the supporting structure.

30. The multi-axis isolation device as claimed in claim 1, wherein said internal components of said isolation modules form one body and are one single part with said equipment or equipment-holder platen.

31. The multi-axis isolation device as claimed in claim 1, wherein said flexible buffers are made from an elastomer and wherein the elastomer used for each said isolation stud and for said flexible buffers is the same.

32. A satellite having a supporting structure supporting at least one vibrating equipment for space application by means of a multi-axis isolation device, said at least one vibrating equipment fitted with said isolation device having to withstand static and dynamic loads including vibrations and shocks to which said at least one vibrating equipment is subjected when the satellite is launched, wherein said isolation device comprises at least three isolation modules adapted to be distributed around a periphery of said vibrating equipment or of an equipment holder platen of said equipment, wherein each isolation module comprises two rigid components one of which, called external component, is adapted to be fixed to said supporting structure, and the other of which, called internal component, is adapted to be fixed to said vibrating equipment or to said platen said internal component and external component being connected to one another by at least one isolation stud made from elastomer, attenuating by at least one stud deformation along at least one of stud axes in traction, compression or shear the transmission of vibrations of low amplitude generated by said equipment, each isolation module also comprising a limited number of three buffers consisting of a lateral flexible buffer and two longitudinal flexible buffers, acting in opposing directions, each of said flexible buffers being mounted onto one of said internal and external components only, and having one free end facing the other of said internal and external components and having no contact with said other component at rest.

33. The satellite according to claim 32, wherein said at least one vibrating equipment comprises at least one rotating part generating vibrations and is selected in the group including: reaction wheels, momentum wheels, inertia wheels, flywheels and control moment gyroscopes.

34. The satellite according to claim 32, wherein said at least one vibrating equipment comprises at least one part subjected to a translational movement comprising at least one periodic time component generating vibrations.

35. The satellite according to claim 32, wherein said isolation device isolates an assembly of equipment mounted onto a same equipment-holder platen and with at least one piece of equipment being a source of interference.

36. The satellite according to claim 32, wherein said isolation device isolates one part of the satellite from another part of the satellite.

* * * * *